US008746783B2

(12) United States Patent
Townson et al.

(10) Patent No.: US 8,746,783 B2
(45) Date of Patent: Jun. 10, 2014

(54) POSITIONING AND REINFORCEMENT STRUCTURE FOR A VEHICLE

(71) Applicant: GM Global Technology Operations LLC, Detroit, MI (US)

(72) Inventors: James M. Townson, Clarkston, MI (US); Mark L. Felzien, Rochester Hills, MI (US); Alexander C. Winter, Northville, MI (US); Arthur M. Melander, Clinton Township, MI (US); David R. Galloway, Davisburg, MI (US); Christopher C. Cook, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/740,965

(22) Filed: Jan. 14, 2013

(65) Prior Publication Data

US 2014/0062140 A1 Mar. 6, 2014

Related U.S. Application Data

(60) Provisional application No. 61/695,667, filed on Aug. 31, 2012.

(51) Int. Cl.
*B62D 25/08* (2006.01)

(52) U.S. Cl.
USPC ............... 296/193.09; 296/193.11; 296/193.1

(58) Field of Classification Search
CPC .... B62D 25/084; B62D 25/085; B62D 25/12; B60K 11/04
USPC ............... 296/193.09, 193.11, 193.1, 203.02; 180/68.4, 69.21
See application file for complete search history.

(56) References Cited

U.S. PATENT DOCUMENTS

| | | | | |
|---|---|---|---|---|
| 4,428,447 | A * | 1/1984 | Malen | 180/68.4 |
| 6,196,624 | B1 * | 3/2001 | Bierjon et al. | 296/193.09 |
| 6,450,276 | B1 * | 9/2002 | Latcau | 180/68.4 |
| 7,497,289 | B2 * | 3/2009 | Kwun et al. | 180/68.4 |
| 7,571,957 | B2 * | 8/2009 | Povinelli et al. | 296/193.09 |
| 2003/0214154 | A1 * | 11/2003 | Tarahomi | 296/193.09 |
| 2005/0088015 | A1 * | 4/2005 | Kishikawa et al. | 296/193.09 |
| 2005/0253419 | A1 * | 11/2005 | Kwon | 296/193.09 |
| 2006/0156547 | A1 * | 7/2006 | Tarahomi | 29/897.2 |
| 2008/0185872 | A1 * | 8/2008 | Povinelli et al. | 296/193.09 |
| 2010/0163324 | A1 * | 7/2010 | Jyoutaki et al. | 180/68.1 |

* cited by examiner

*Primary Examiner* — Jason S Morrow
(74) *Attorney, Agent, or Firm* — Cantor Colburn LLP

(57) ABSTRACT

A positioning and reinforcement structure for a vehicle includes a top support member and a bottom support member each extending relatively horizontally in a cross-car orientation and relatively parallel to each other. Also included is a first side member and a second side member each extending relatively vertically and relatively parallel to each other, the first side member and the second side member each coupled to the top support member and the bottom support member. Further included is a first wing structure detachably coupled to the first side member, the first wing structure comprising a first side flange configured to operably mount to a first fender assembly. Yet further included is a centering bracket disposed proximate a top side of the top support member, the centering bracket configured to locate a front region of a hood to the positioning and reinforcement structure.

20 Claims, 18 Drawing Sheets

76
12
14
60
98
30
28
27
26
20
142
10

98
97
97
30
96
60
72

14
12
80
97
97
70
74
84
82
76

POSITIONING AND REINFORCEMENT STRUCTURE FOR A VEHICLE

CROSS-REFERENCE TO RELATED APPLICATION

This application claims the benefit of U.S. Provisional Application Ser. No. 61/695,667 filed Aug. 31, 2012 which is hereby incorporated herein by reference in its entirety.

FIELD OF THE INVENTION

The subject invention relates to vehicles, and more particularly to a positioning and reinforcement structure for a vehicle.

BACKGROUND

Vehicles, such as automobiles, are assembled by aligning and fastening numerous components and sub-assemblies to one another. One region of the automobile requiring assembly of such components and sub-assemblies is a front end region, sometimes referred to as a "front clip." The front clip is commonly defined as the region of the vehicle extending from the A-pillar to the most forwardly disposed component, typically a front bumper. The front clip includes a structural frame, as well as a variety of components that collectively form a body.

Several efforts to directly or indirectly mount and/or fix the body components to each other, as well as to the frame have included several approaches which rely on machined body mounting locations for the body components. Approaches relying on such body mounting locations have undesirably led to large variations in alignment and fastening of components to each other. Numerous issues related to large variations may influence the aesthetic appearance of the automobile and may be the cause of functional deficiencies, such as opening/closing efforts, alignment and mutilation, to name a few, which each may affect consumer satisfaction.

SUMMARY OF THE INVENTION

In one exemplary embodiment of the invention, a positioning and reinforcement structure for a vehicle includes a top support member and a bottom support member each extending relatively horizontally in a cross-car orientation and relatively parallel to each other. Also included is a first side member and a second side member each extending relatively vertically and relatively parallel to each other, the first side member and the second side member each coupled to the top support member and the bottom support member. Further included is a first wing structure detachably coupled to the first side member, the first wing structure comprising a first side flange configured to operably mount to a first fender assembly. Yet further included is a centering bracket disposed proximate a top side of the top support member, the centering bracket configured to locate the positioning and reinforcement structure to a front region of a hood.

In another exemplary embodiment of the invention, a front end assembly for a vehicle includes a first fender having an aft end and a forward end, the aft end fixable to a region in close proximity with a front edge of a vehicle door, the forward end including a fender flange. Also included is a radiator support fixedly connected to a frame of the vehicle. Further included is a positioning and reinforcement structure disposed forwardly of, and removably coupled to, the radiator support. The positioning and reinforcement structure includes a first side flange operably coupled to the fender flange. The positioning and reinforcement structure also includes a top support member extending relatively horizontally. The positioning and reinforcement structure further includes a centering bracket disposed proximate a top side of the top support member, the centering bracket configured to locate the positioning and reinforcement structure to a front region of a hood.

In yet another exemplary embodiment of the invention, a vehicle includes a rear portion. Also included is a front end portion of the vehicle fixable to the rear portion, the front end portion including a fender having a forward end including a fender flange. The front end portion also includes a radiator support fixedly connected to a frame of the vehicle. The front end portion further includes a positioning and reinforcement structure disposed forwardly of, and removably coupled to, the radiator support. The positioning and reinforcement structure includes a side flange operably coupled to the fender flange. The positioning and reinforcement structure also includes a top support member extending relatively horizontally. The positioning and reinforcement structure further includes a centering bracket disposed proximate a top side of the top support member, the centering bracket configured to locate the positioning and reinforcement structure to a front region of a hood.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
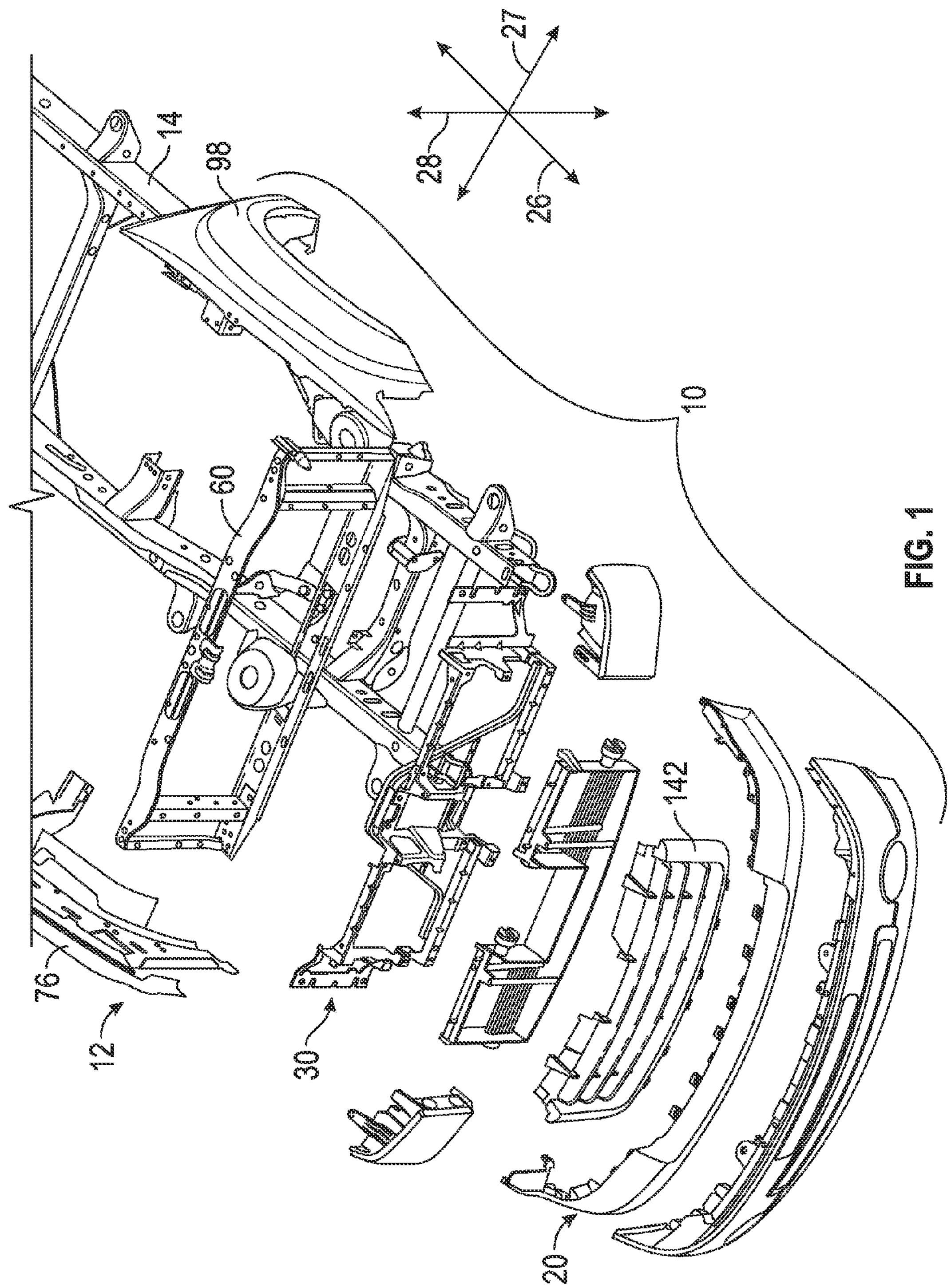
FIG. 1 is a simplified, partially disassembled perspective view of a front end assembly of a vehicle.
Figure 2:
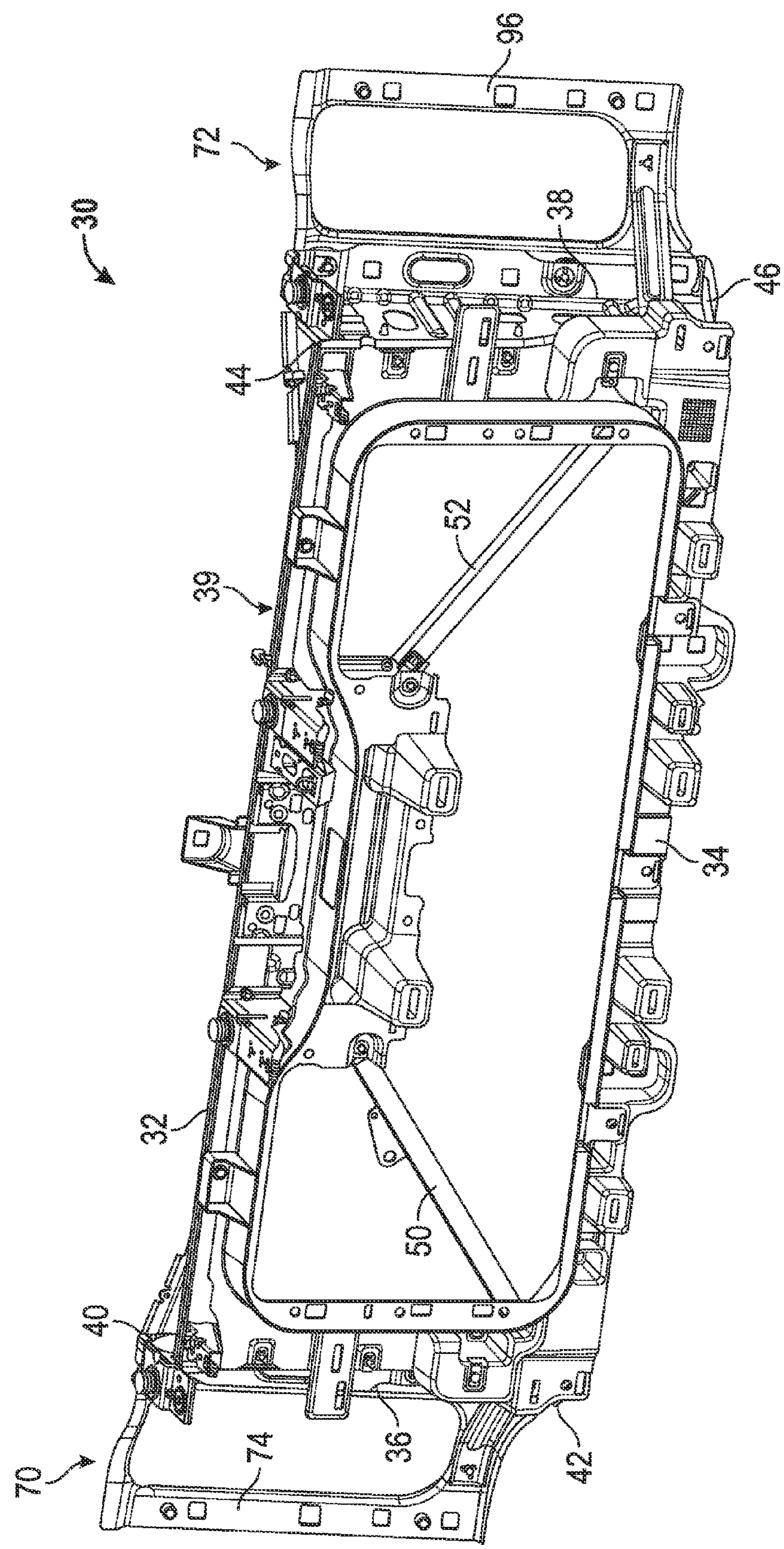
FIG. 2 is a perspective view of a positioning and reinforcement structure of the front end assembly.
Figure 3:
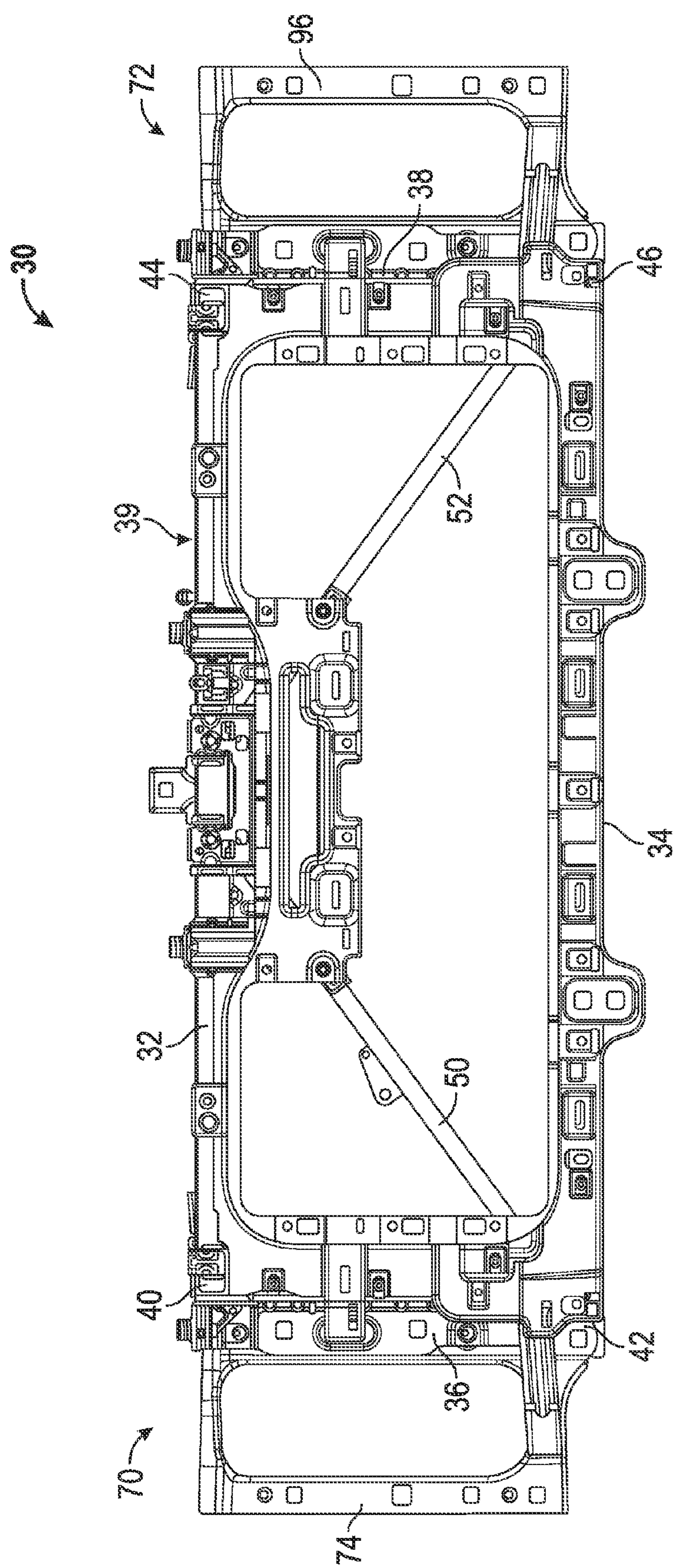
FIG. 3 is a front elevational view of the positioning and reinforcement structure.
Figure 4:
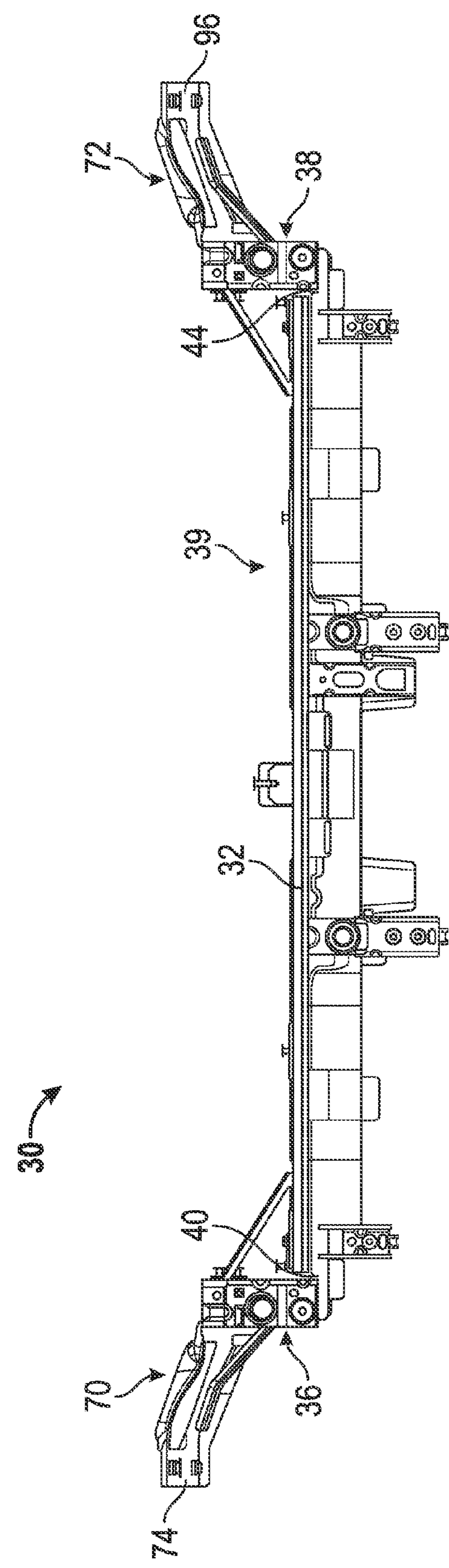
FIG. 4 is a top plan view of the positioning and reinforcement structure.
Figure 5:
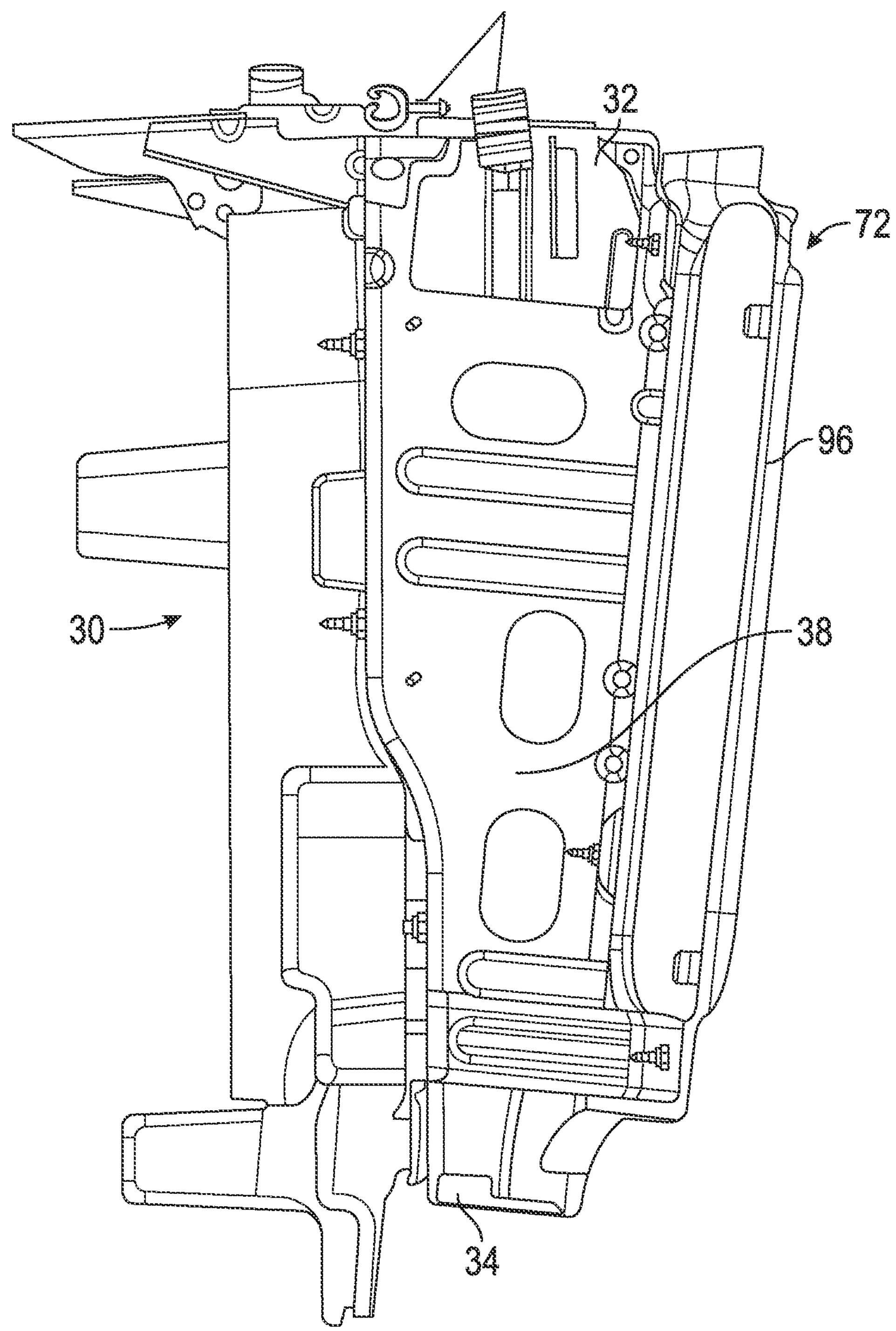
FIG. 5 is a front elevational view of the positioning and reinforcement structure.
Figure 6:
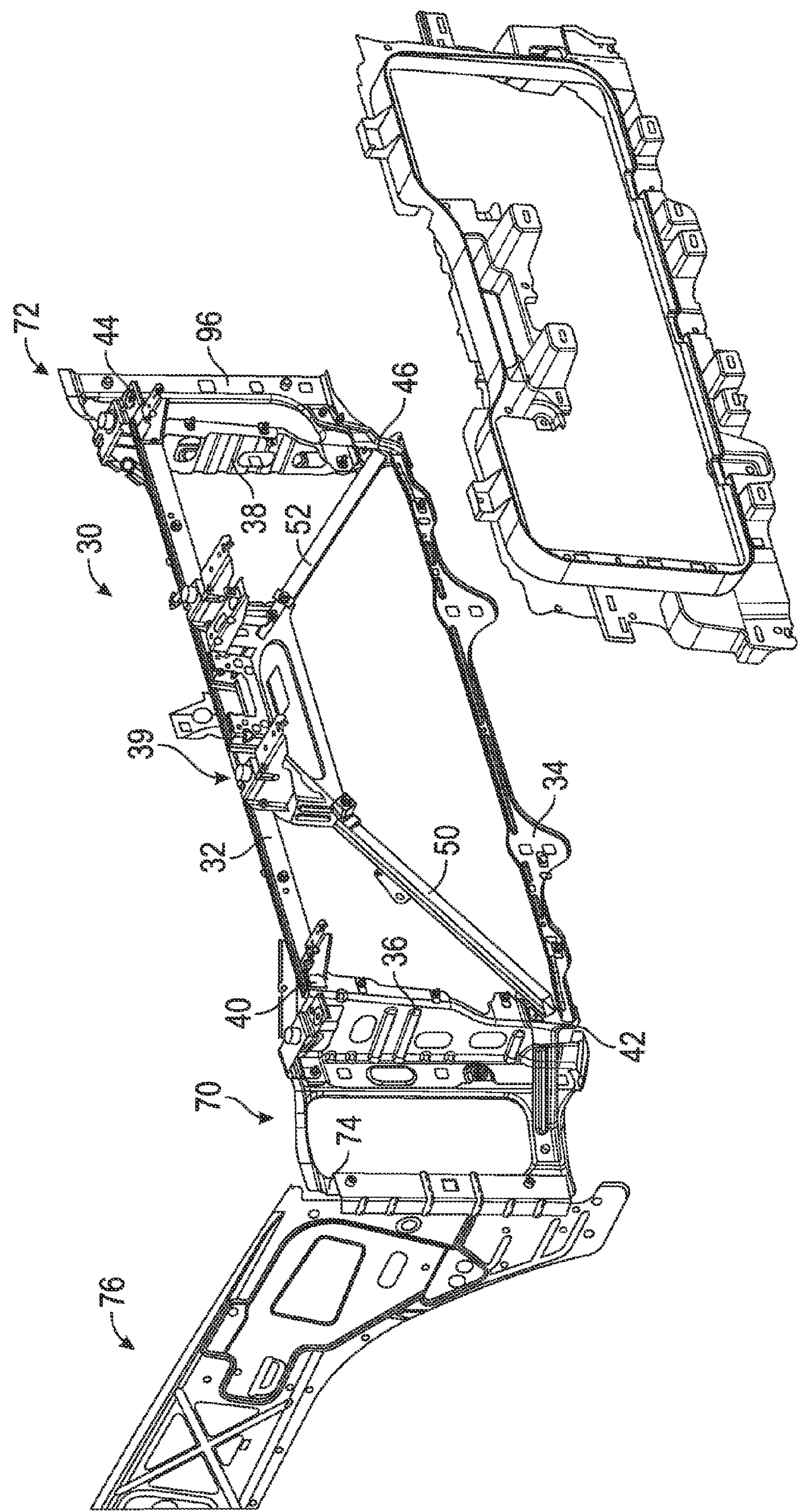
FIG. 6 is a partially disassembled perspective view of the positioning and reinforcement structure.

The following description is merely exemplary in nature and is not intended to limit the present disclosure, its application or uses. It should be understood that throughout the drawings, corresponding reference numerals indicate like or corresponding parts and features.

Referring to FIG. 1, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending from what is commonly referred to as an "A-pillar" 18 (best illustrated in FIG. 9) to a forwardly disposed component, such as a bumper 20 for the vehicle 12. The front end assembly 10 may be interchangeably referred to as a "front clip" of the vehicle 12.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. Additionally, the positioning and reinforcement structure 30 provides structural support for directly and indirectly attached components. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as positioning and reinforcement assembly 30 or GOR assembly. As will be described in detail below, the positioning and reinforcement structure 30 includes locators, fastening features, and other critical dimensional relationship interfaces of several components and sub-assemblies. Such components and sub-assemblies typically include fender assemblies, headlamps, grills, fascias, bumpers and bumper attachment features, hoods, hood latches, hood bumpers and under-hood closeout panels, air baffles and radiator supports, for example. It is to be understood that the preceding list is merely illustrative of the numerous components and sub-assemblies which may be included in the front end assembly 10 and may benefit from the positioning and reinforcement structure 30. Exemplary components and sub-assemblies will be described in detail below. As used herein, an axial direction, or a fore-aft direction 26 refers to a direction that extends frontward and rearward along an axis of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Referring now to FIGS. 2-6, in conjunction with FIG. 1, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in a cross-car direction 27 and relatively parallel to each other. The first side member 36 and the second side member 38 extend relatively parallel to each other, but in a relatively vertical direction 28. As may be understood the positioning and reinforcement structure 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement structure 30, such as by casting, laser welding or spot welding process, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Irrespective of the precise attachment, the top support member 32, the bottom support member 34, the first side member 36 and the second side member 38 form a central portion 39 of the positioning and reinforcement structure 30. Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30 or GOR structure may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30.

Figure 7:
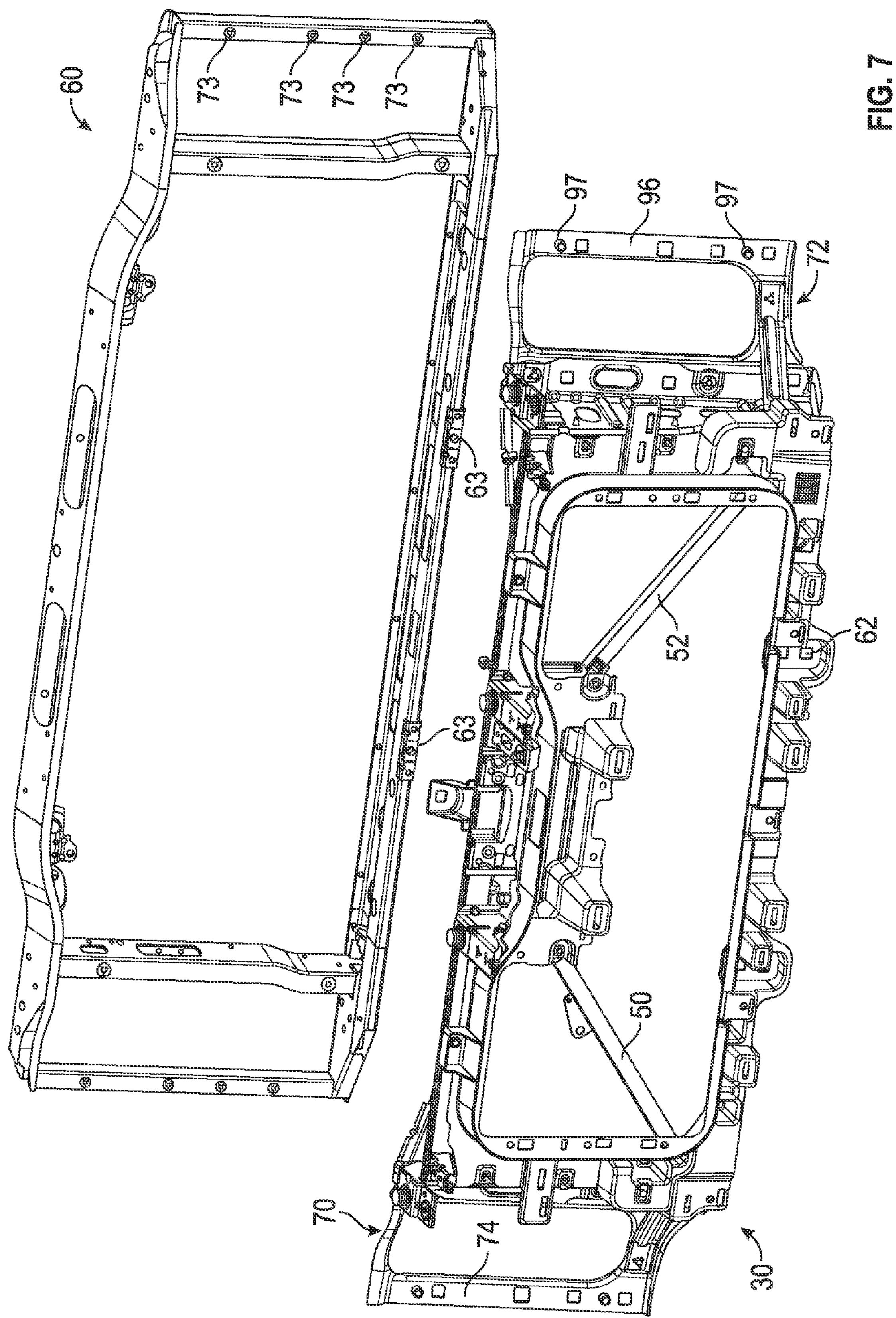
FIG. 7 is a perspective view of a radiator support prior to operable coupling with the positioning and reinforcement structure.
Figure 8:
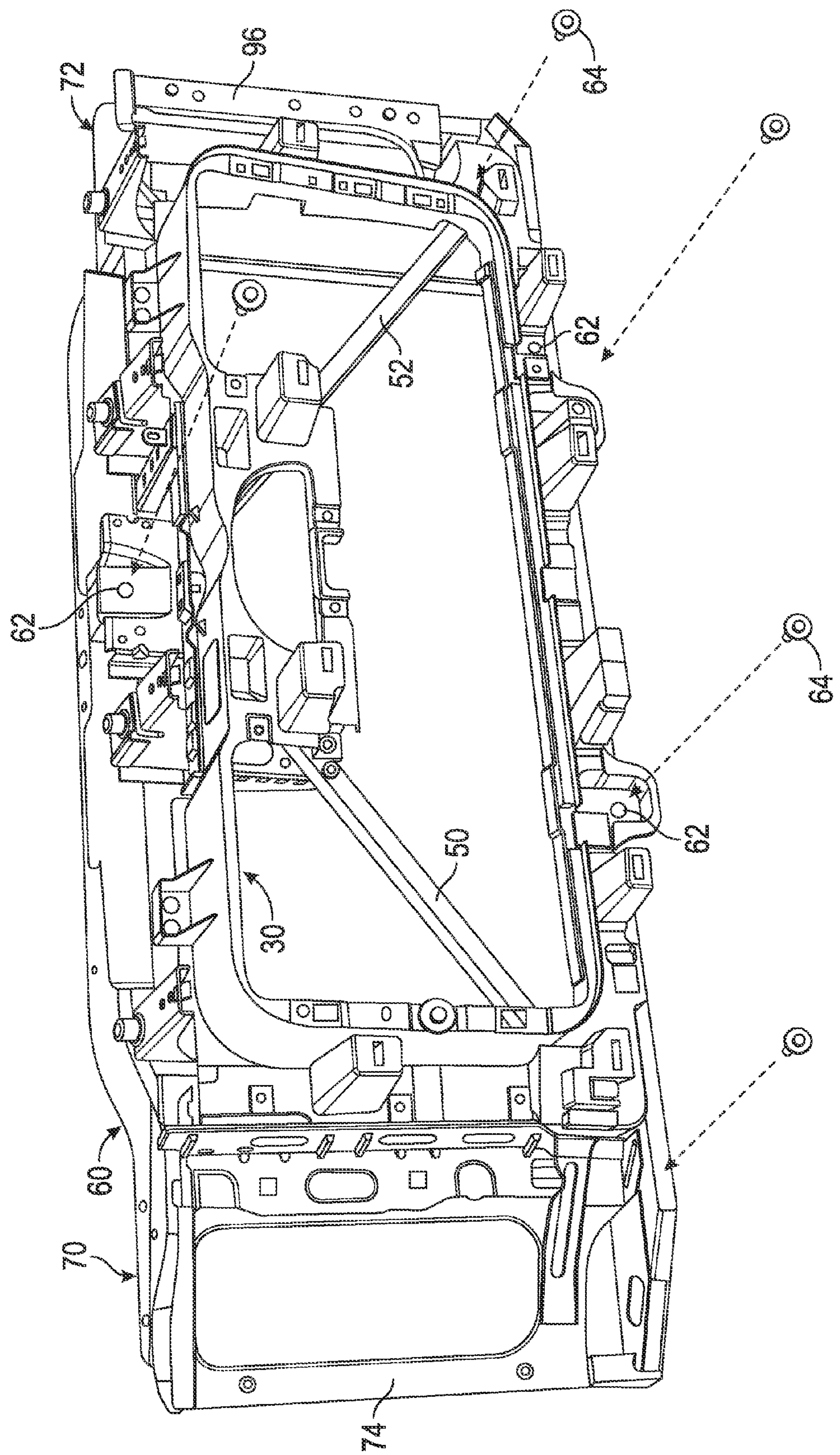
FIG. 8 is a perspective view of the radiator support and the positioning and reinforcement structure operably coupled.

Referring now to FIGS. 7 and 8, a radiator support 60 is configured to operably couple to an aft portion of the positioning and reinforcement structure 30. A plurality of apertures 62 are disposed in numerous locations along the positioning and reinforcement structure 30 that correspond to receiving structures 63 disposed within a front face of the radiator support 60. A plurality of mechanical fasteners 64 are employed and extend through the plurality of apertures 62 into the receiving structures of the radiator support 60 to fixedly retain the positioning and reinforcement structure 30 to the radiator support 60. It is to be appreciated that although the positioning and reinforcement structure 30 and the radiator support 60 are ultimately disposed in a fixed relationship to each other, a loose fitting relationship between the positioning and reinforcement structure 30 and the radiator support 60 is employed during several assembly phases of the front end assembly 10. Specifically, while the radiator support 60 is fixedly secured to the frame 14, the positioning and reinforcement structure 30 has at least one degree of freedom with respect to displacement relative to the radiator support 60. Such a relationship allows the positioning and reinforcement structure 30 to move during mounting of other components to the positioning and reinforcement structure 30. The tight, fixed relationship between the positioning and reinforcement structure 30 and the radiator support 60 is not established until various other components of the front end assembly 10 are properly located and mounted, as will be described in detail below.

Figure 9:
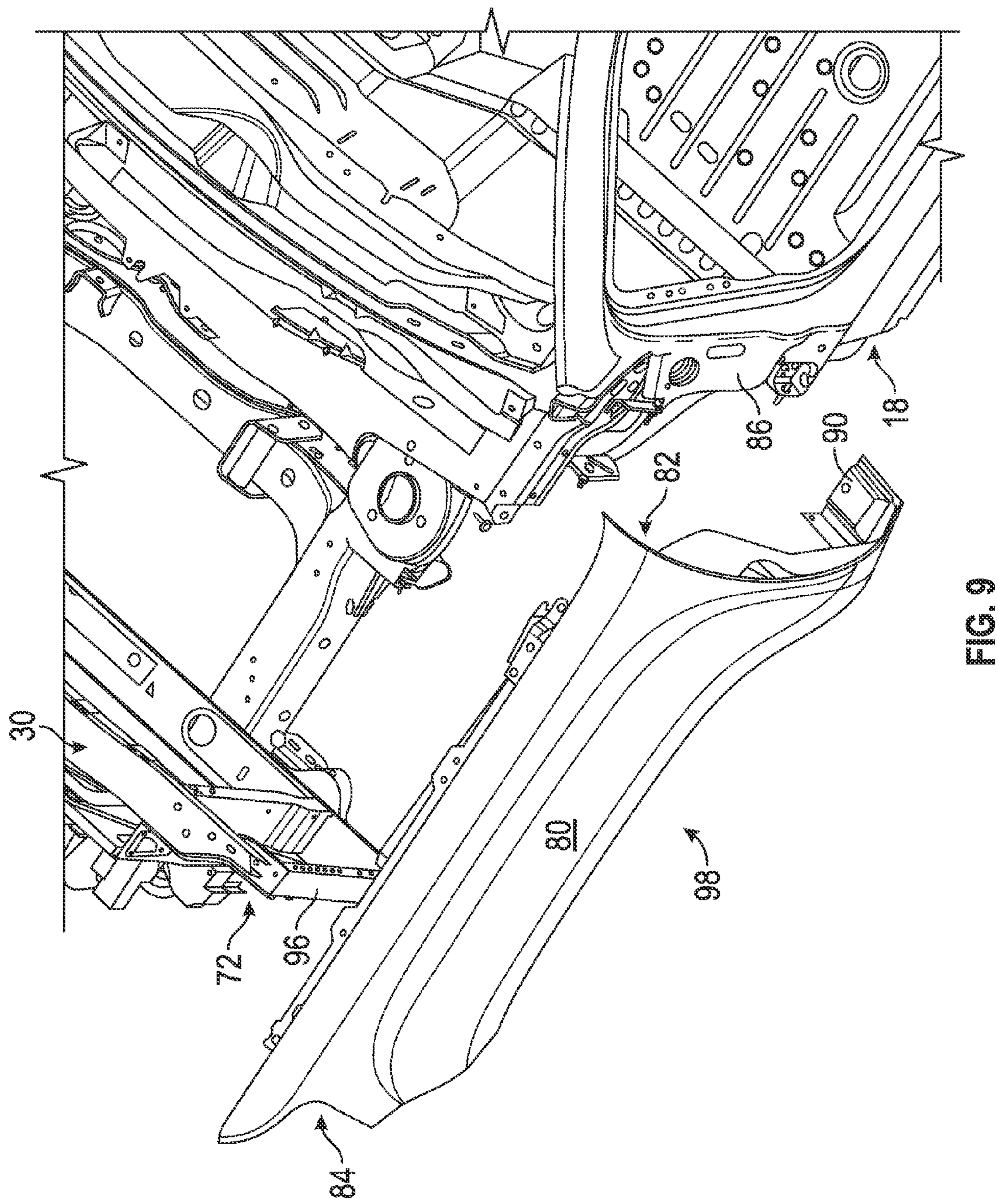
FIG. 9 is a top, rear perspective view of a fender assembly prior to installation to the vehicle.
Figure 10:
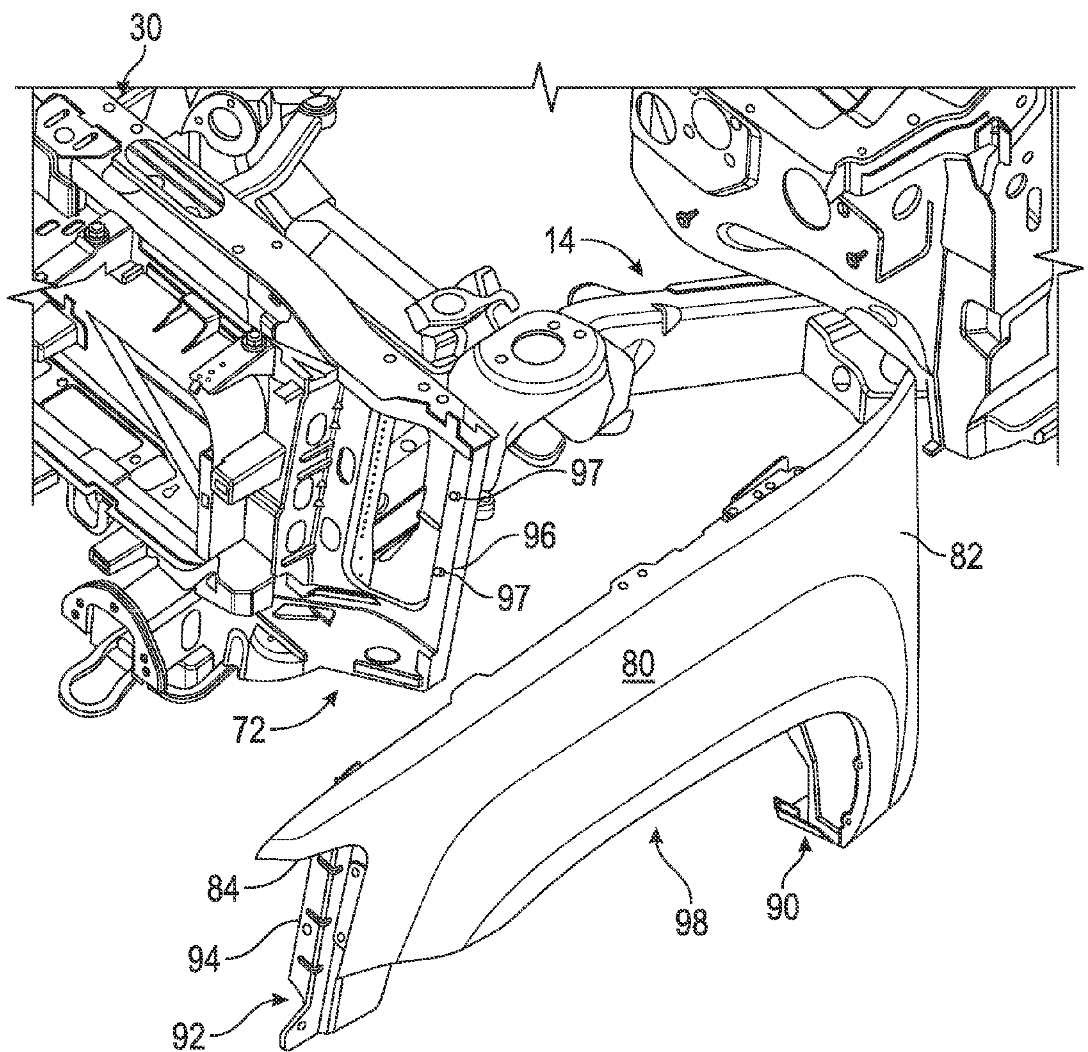
FIG. 10 is a top, front perspective view of the fender assembly.
Figure 11:
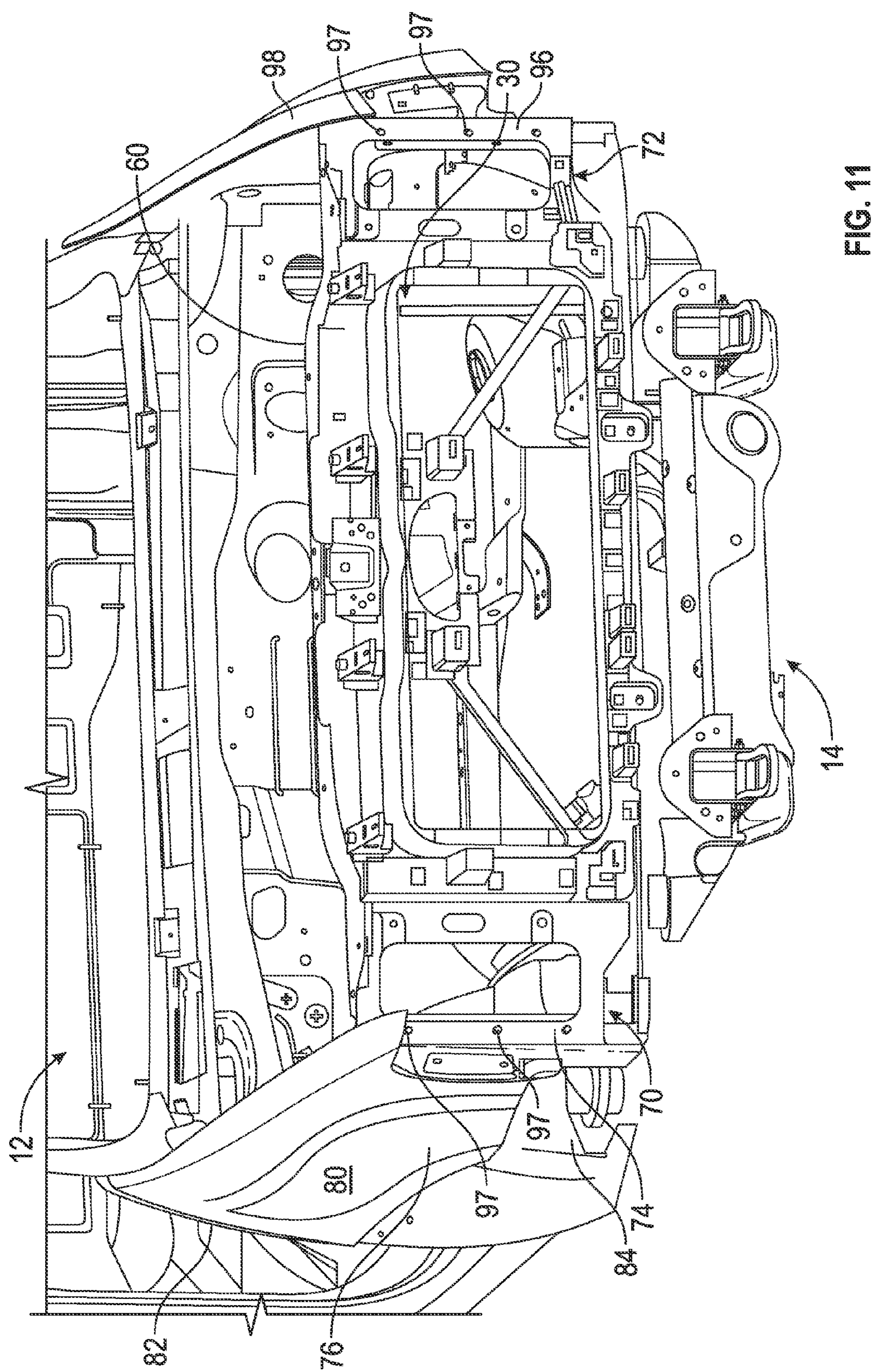
FIG. 11 is a perspective view of the fender assembly operably coupled to the radiator support and the positioning and reinforcement structure.

Referring again to FIGS. 2-6, in combination with FIGS. 9-11, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly 76. As will be described below, a second fender assembly 98 is also included and comprises identical components as that of the first fender assembly 76, such that common reference numerals are employed. Additionally, reference to the illustrated embodiments may interchangeably denote components of the first fender assembly 76 and the second fender assembly 98 for purposes of discussion. The first fender assembly 76 and the second fender assembly each include a fender 80 having an aft end 82 and a forward end 84, with the aft end 82 being fixable to a region in close proximity to a front edge 86 of a vehicle door opening. A fender mount bracket 90 disposed at the aft end 82 facilitates a structural connection proximate the front edge 86 of the vehicle door. Alternatively, a connection may be made between the aft end 82 of the fender 80 and the front edge 86 of the vehicle door opening. The positioning of the first fender assembly 76, and more specifically the fender 80, is the first in a chain of inter-component locating. The aft end 82 is positioned relative to the front edge 86 of the vehicle door opening to establish a desired gap between the fender 80 and the vehicle door opening, thereby reducing undesirably small or large gaps. The forward end 84 of the fender 80 includes a fender flange 92 having one or more apertures 94 for receiving one or more pins 97 extending forwardly from the first side flange 74 of the first wing structure 70, thereby establishing a displaceable relationship between the first fender assembly 76 and the positioning and reinforcement structure 30, while setting the positioning and reinforcement structure 30 in the vertical direction 28.

The second wing structure 72 includes a second side flange 96 proximate an outermost location of the second wing structure 72 for fixing the positioning and reinforcement structure 30 to the second fender assembly 98. As noted above, the second fender assembly 98 is a mirror image of the first fender assembly 76 and is disposed at an opposite cross-car location of the vehicle 12, such that detailed description of the second fender assembly 98 is unnecessary, as are associated reference numerals. Similar to the first fender assembly 76, the second fender assembly 98 mounts to a region proximate a front edge 86 of a vehicle door opening and a displaceable relationship between the second fender assembly 98 and the positioning and reinforcement structure 30 is established by disposal of the fender flange 92 over at least one pin 97 of the second side flange 96.

The first fender assembly 76 and the second fender assembly 98 are each attached to the radiator support 60 with one or more mechanical fasteners extending through at least one location proximate the first side flange 74 and the second side flange 96 of the first wing structure 70 and the second wing structure 72, respectively, the mechanical fasteners further extending through corresponding receiving apertures 73 disposed in the radiator support 60. Fastening of the first fender assembly 76 to the radiator support 60 sets the radiator support in a fore-aft direction 26. The mechanical fasteners may comprise a threaded fastener, such as a shoulder bolt, which draws the radiator support 60 forwardly to an aft surface of the positioning and reinforcement structure 30, thereby establishing a fore-aft plane that the radiator support 60 and the positioning and reinforcement structure 30 are located in. Specifically, the first fender assembly 76 and the second fender assembly 98 determine the fore-aft location of the radiator support 60 and the positioning and reinforcement structure 30 upon engagement of the first fender assembly 76 and the second fender assembly 98 with the positioning and reinforcement structure 30 and the radiator support 60. As described above, the radiator support 60 has a loose fitting relationship with the positioning and reinforcement structure 30 during at least a portion of the assembly, and a slipping relationship between the radiator support 60 and the positioning and reinforcement structure 30 in the cross-car direction 27 (FIG. 1) and the up-down direction is maintained subsequent to establishing the fore-aft location.

Figure 12:
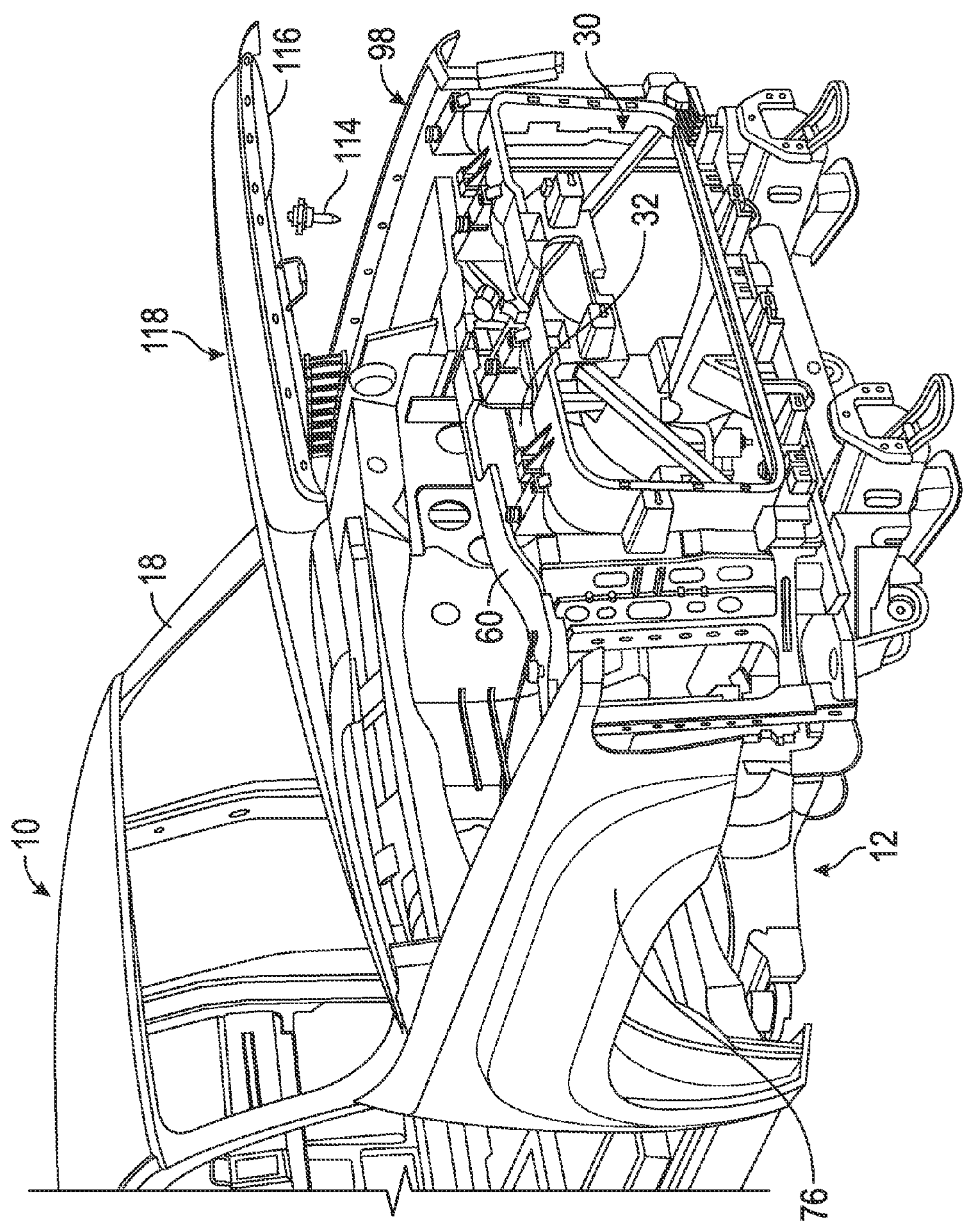
FIG. 12 is a perspective view of a hood disposed proximate the positioning and reinforcement structure.
Figure 13:
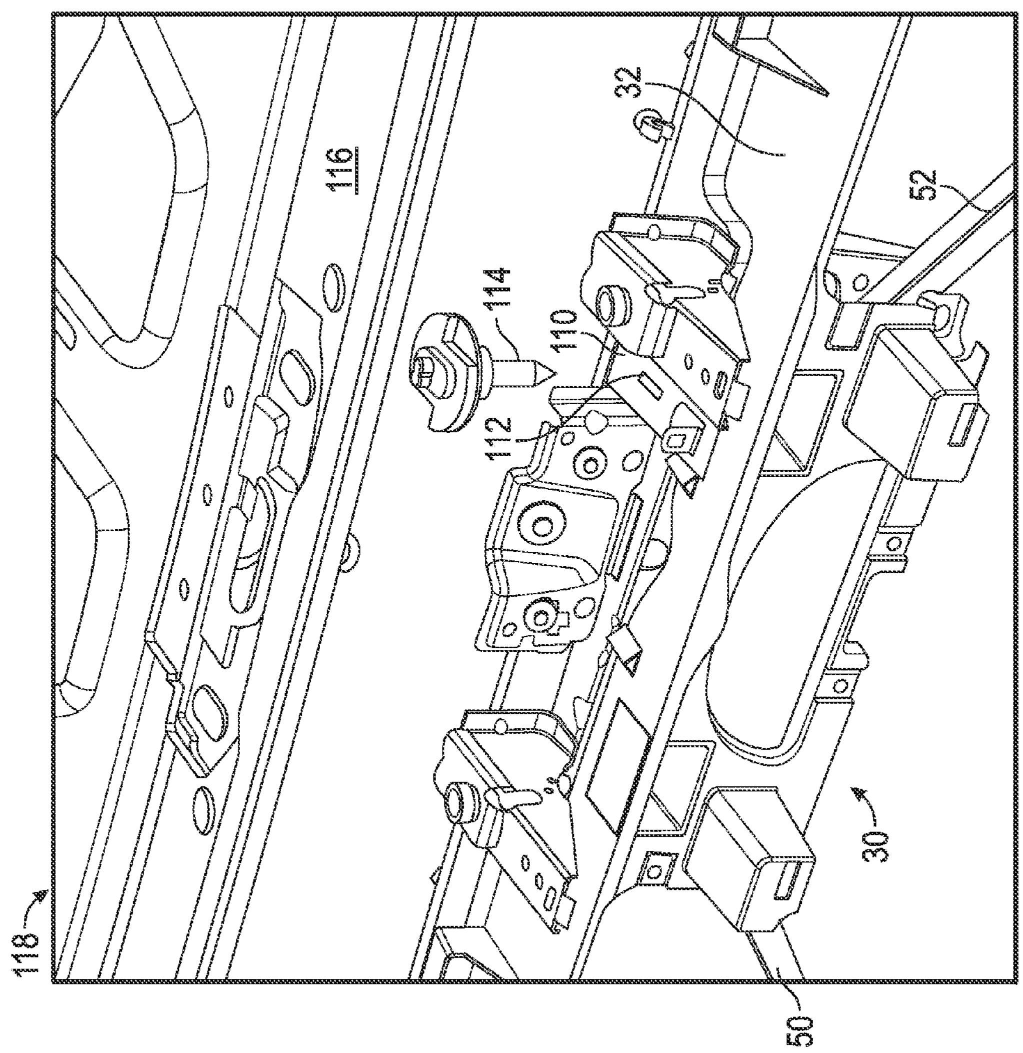
FIG. 13 is a perspective view of the hood prior to locating the hood relative to the positioning and reinforcement structure.

Referring now to FIGS. 12 and 13, disposed in a securely fixed manner proximate the top support member 32 of the positioning and reinforcement structure 30 is a centering bracket 110 that includes a hood locating aperture 112 configured to receive a centering pin 114 operably connected to, and extending downward from, an underside 116 of a hood 118. The hood 118 is pivotably connected to the vehicle 12 proximate the A-pillar 18. Upon insertion of the centering pin 114 into the hood locating aperture 112, a fixed relationship between the hood 118 and the positioning and reinforcement structure 30 is established in the cross-car direction 27 (FIG. 1), such that cross-car movement of either the positioning and reinforcement structure 30 or the hood 118 results in a corresponding cross-car movement of the other component. In this way, the positioning and reinforcement structure 30 is centered relative to the hood 118. Although the centering pin 114 is illustrated and described above as being operably connected to the hood 118, it is contemplated that the centering pin 114 is coupled to, and extends upward from, the centering bracket 110, with the hood locating aperture 112 being disposed within the underside 116 of the hood 118.

As noted above, and as will be further apparent from the description below, the centering bracket 110 is employed to locate and secure one or more components relative to one another to provide a desired dimensional and structural configuration. In one embodiment, the centering bracket 110 provides a datum reference location that several components of the front end assembly 10 are directly or indirectly positioned relative to. Such an embodiment provides a single common locating feature, thereby reducing the tolerance stack-up that commonly persists in front end assemblies requiring a plurality of locating features manufactured independent of each other.

Figure 14:
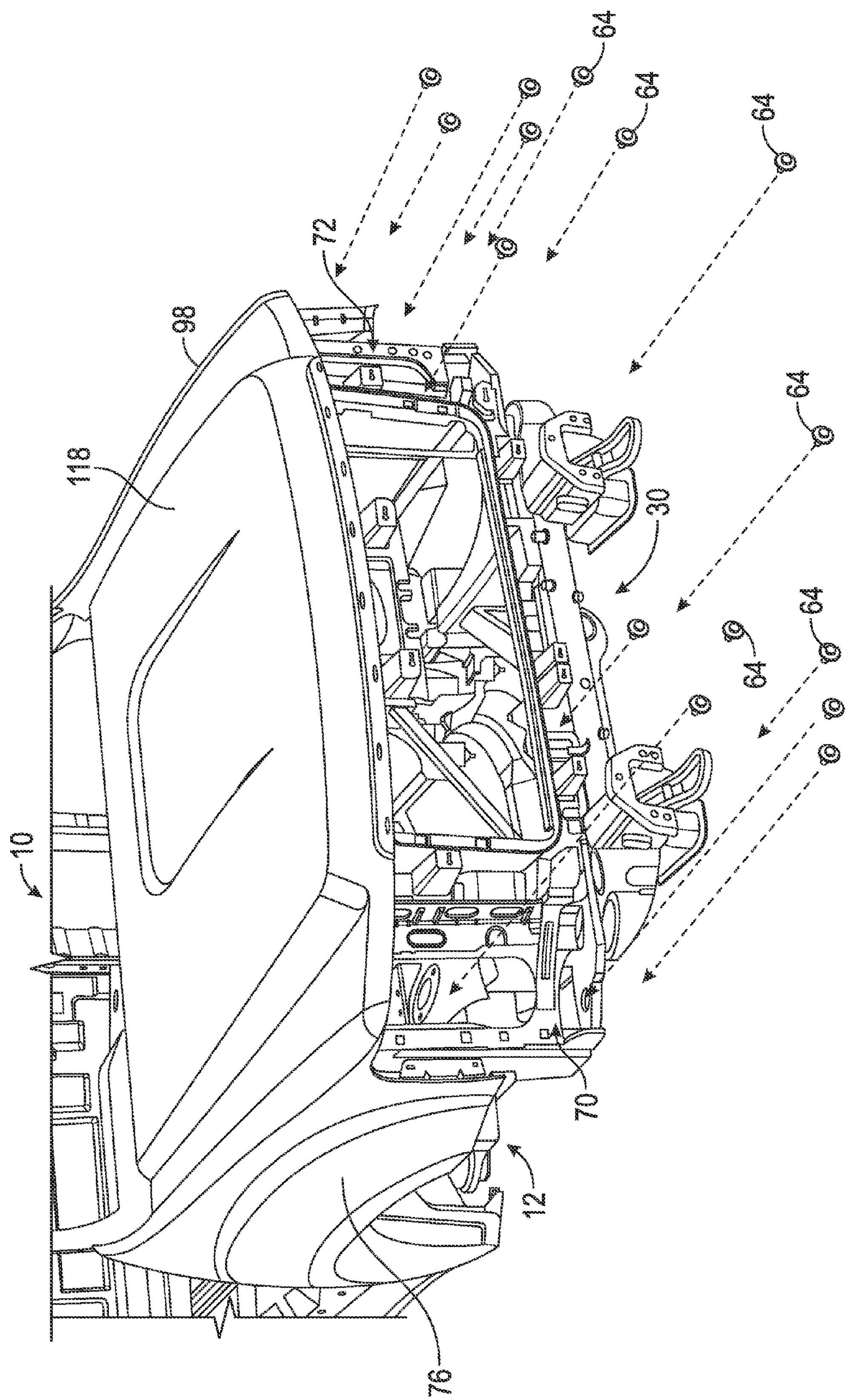
FIG. 14 is a perspective view illustrating the positioning and reinforcement structure being fixedly secured to the radiator support.

Referring to FIG. 14, although it is contemplated that final, tight-fitting securement between the positioning and reinforcement structure 30 and the radiator support 60 may be established at various points during assembly of the front end assembly 10, an exemplary embodiment includes final mechanical fastening subsequent to establishing the fixed cross-car relationship between the hood 118 and the positioning and reinforcement structure 30. The tight-fitting relationship between the positioning and reinforcement structure 30 and the radiator support 60 sets desired gap spacing between the hood 118 and the first fender assembly 76 and the second fender assembly 98.

Figure 15:
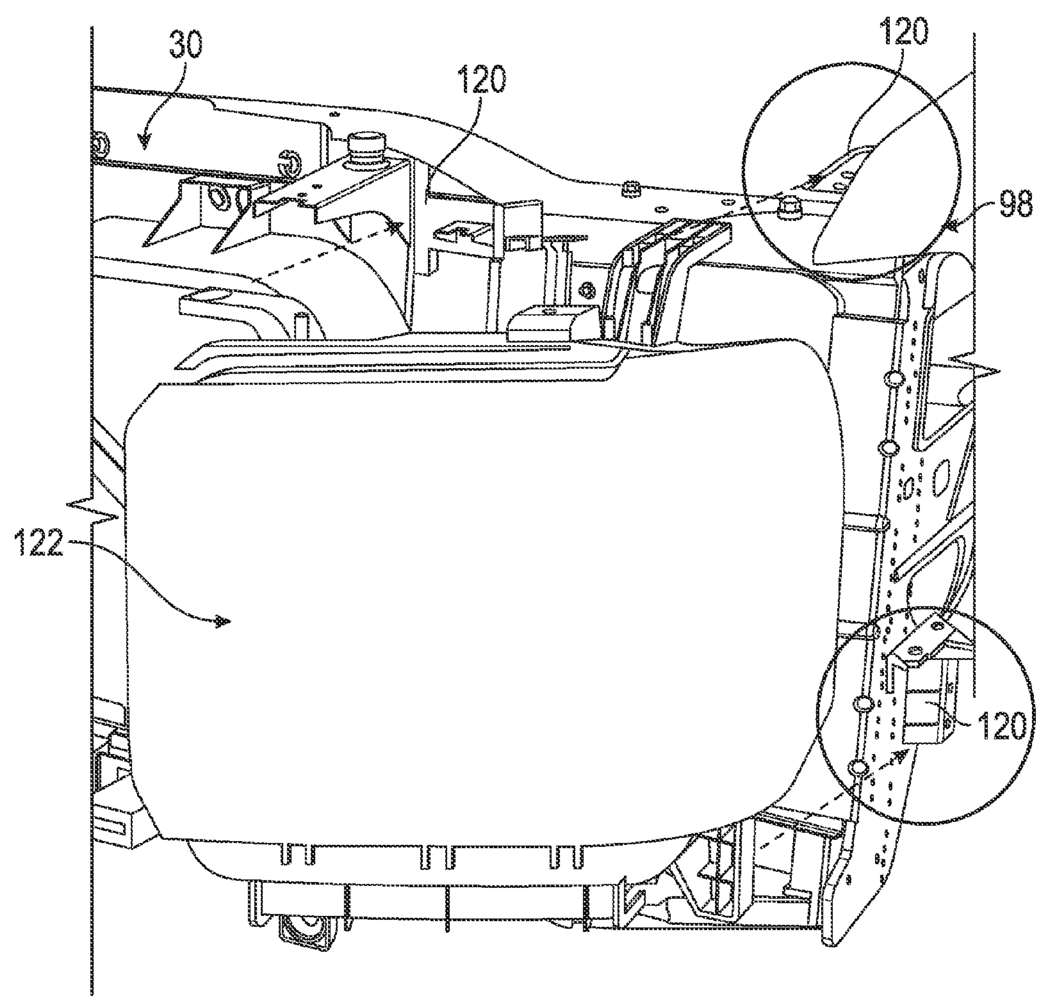
FIG. 15 is a perspective view illustrating a headlamp assembly being installed.

As illustrated in FIG. 15, in addition to the previously described locating and mounting features associated with the positioning and reinforcement structure 30, a plurality of headlamp locating and mounting interfaces 120 are included in association with loading, staging, locating and mounting of a headlamp assembly 122. The plurality of headlamp locating and mounting interfaces 120 may include such features as guiding paths to facilitate insertion of the headlamp assembly 122 in the fore-aft direction 26 (FIG. 1), as well as apertures and/or mechanical fasteners to securely retain the headlamp assembly 122, which may also be in operable connection with either fender assembly 76, 98.

Figure 16:
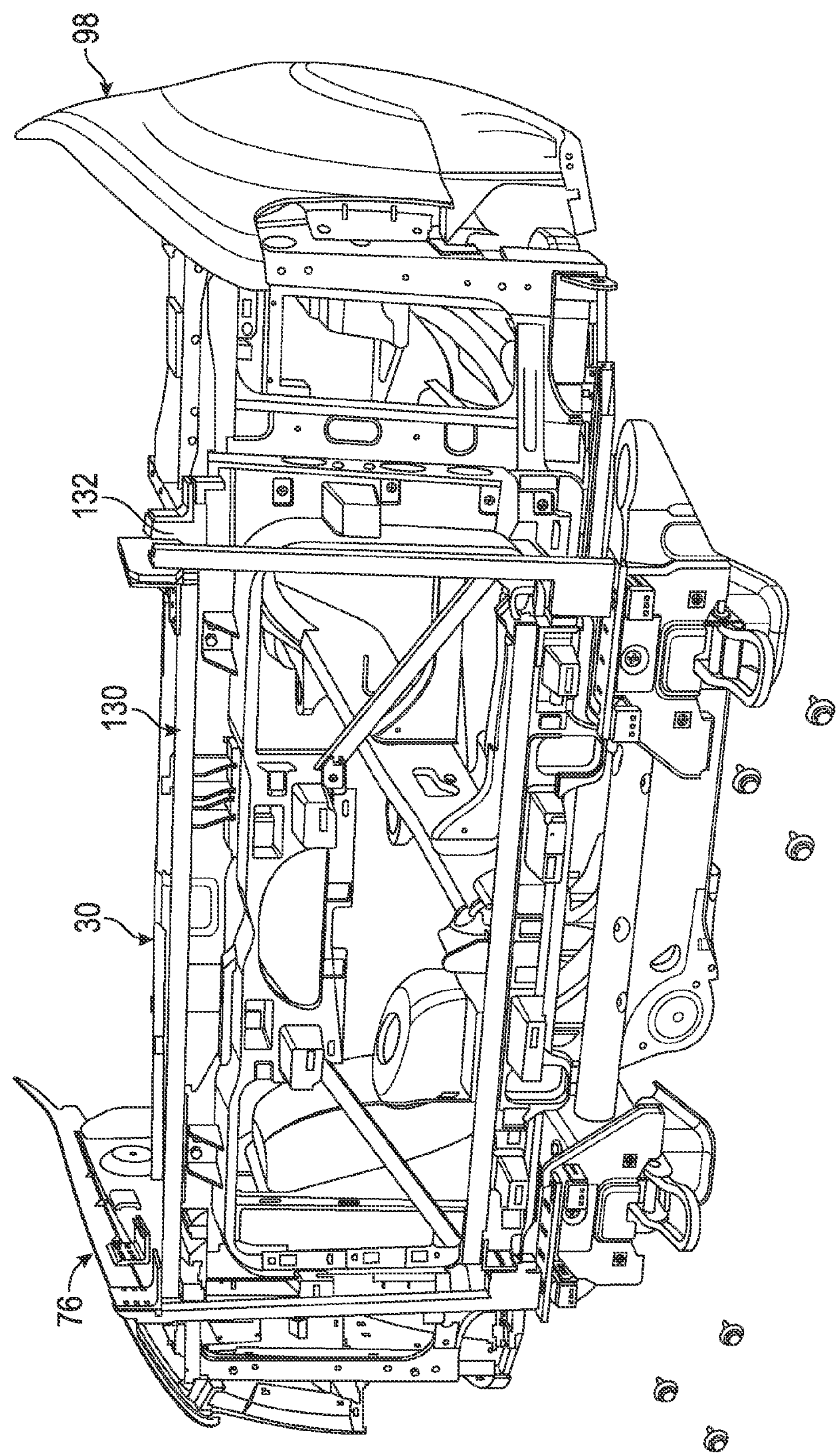
FIG. 16 is a perspective view of a bumper attachment bracket disposed proximate a forward side of the positioning and reinforcement structure.

Additionally, a bumper attachment bracket 130 (FIG. 16) utilizes bumper attachment bracket locating features 132 extending forwardly from the positioning and reinforcement structure 30 to ensure proper positioning of the bumper attachment bracket 130 prior to securing the bumper attachment bracket 130 to the frame 14 of the vehicle 12. Establishing proper positioning of the bumper attachment bracket 130 facilitates achieving a desired location of a bumper upon attachment to the bumper attachment bracket 130.

Figure 17:
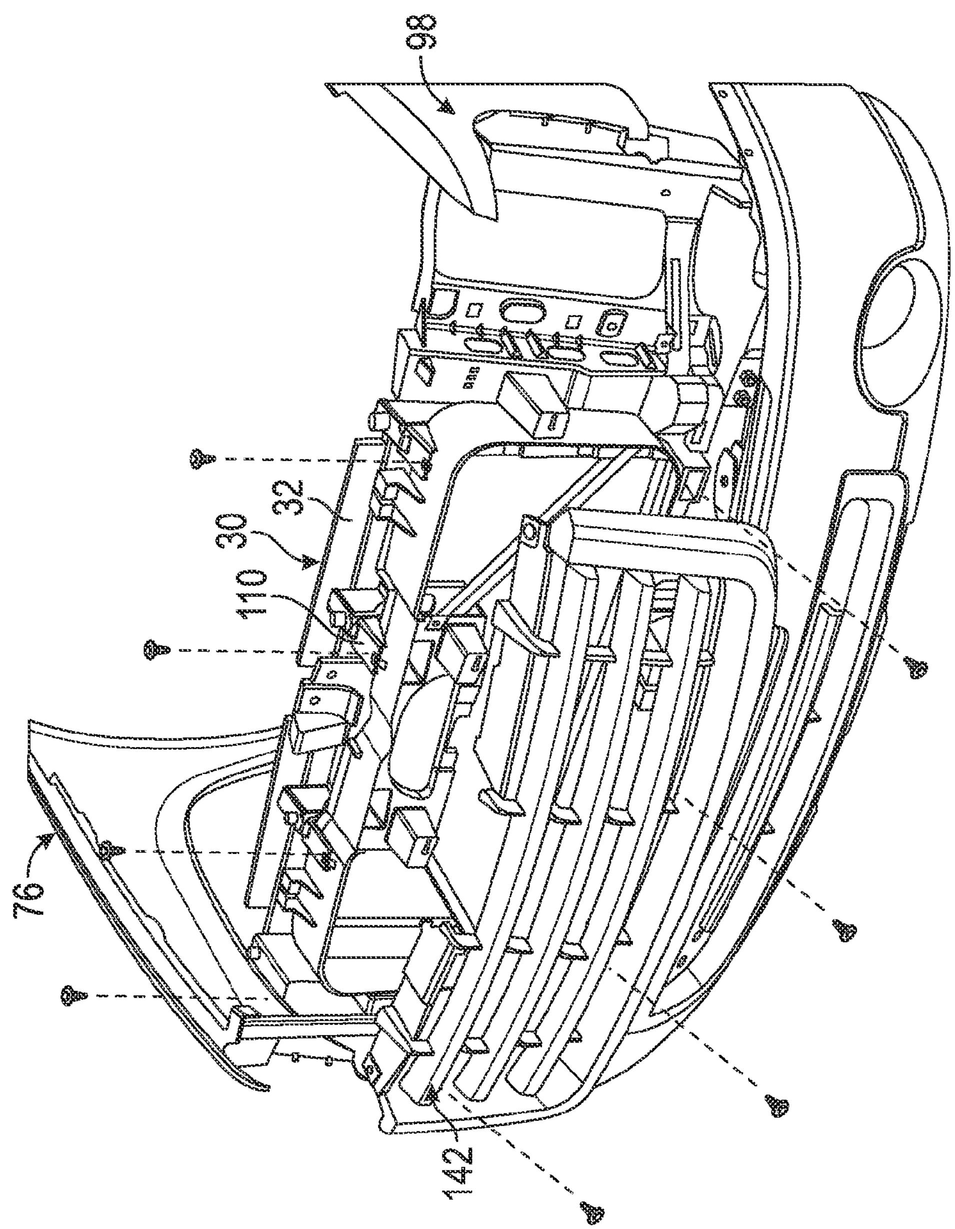
FIG. 17 is a perspective view illustrating installation of a grill to the positioning and reinforcement structure.
Figure 19:
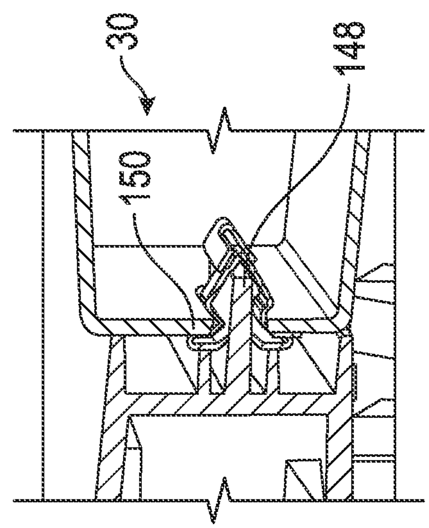
FIG. 19 is a perspective view of a grill retaining feature received within a grill retaining interface of the positioning and reinforcement structure.
Figure 18:
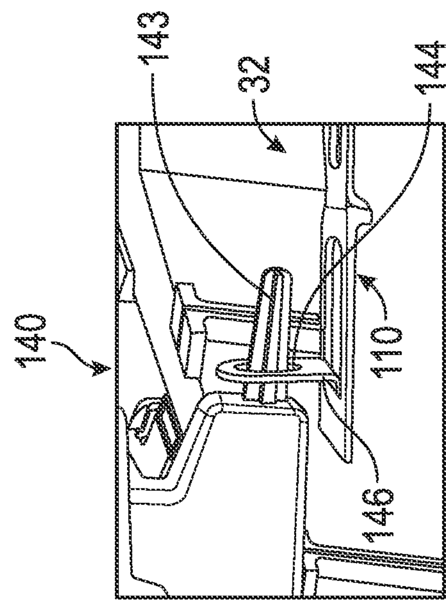
FIG. 18 is a perspective view of a grill locating feature operably coupled to the positioning and reinforcement structure.

Referring to FIGS. 17-19, a grill locating feature 140 is disposed on the positioning and reinforcement structure 30 to properly locate a grill 142 upon mounting to the front end assembly 10. The grill locating feature 140 may be in the form of an aperture located proximate the top support member 32 and in an exemplary embodiment, the grill locating feature 140 comprises an aperture 144 disposed within an upstanding portion 146 of the centering bracket 110, which was described in detail above. In the exemplary embodiment referenced, the grill 142 includes a protrusion, such as a pin 143, configured to fittingly extend into the aperture 144 of the centering bracket 110, thereby locating the grill 142 in a cross car direction. There are also grille locating features on the top support member 32 and support bracket hardware that locate and set the grill 142 in the fore-aft direction 26 (FIG. 1) and the vertical direction 28. One or more grill retaining features 148, such as clips, attached to the grill 142 extend into corresponding grill retaining interfaces 150 disposed within the positioning and reinforcement structure 30. Additional securement of the grill 142 may be achieved by employing a plurality of mechanical fasteners through the grill 142 and into corresponding receiving structures.

Advantageously, the positioning and reinforcement structure 30 is desensitized dimensionally from the radiator support 60, as well as the frame 14 of the vehicle 12 generally, such that relative movement between the two components is provided during at least a portion of the assembly process of the front end assembly 10. Various locating and retaining features provide a datum for ensuring desirable dimensional relationships between several components of the front end assembly 10, thereby reducing negative issues associated with tolerance stack-up and manufacturing variation, as seen in typical assembly processes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A positioning and reinforcement structure for a vehicle comprising:

a top support member and a bottom support member each extending relatively horizontally in a cross-car orientation and relatively parallel to each other;

a first side member and a second side member each extending relatively vertically and relatively parallel to each other, the first side member and the second side member each coupled to the top support member and the bottom support member;

a first wing structure detachably coupled to the first side member, the first wing structure comprising a first side flange configured to operably mount to a first fender assembly; and a centering bracket disposed proximate a top side of the top support member, the centering bracket configured to locate the positioning and reinforcement structure to a front region of a hood;

wherein the positioning and reinforcement structure is removably coupled to a forward portion of a radiator support that is directly coupled to a frame of the vehicle.

2. The positioning and reinforcement structure of claim 1, further comprising a plurality of locating and attachment components for attachment of at least one automotive component to the positioning and reinforcement structure.

3. The positioning and reinforcement structure of claim 2, wherein the at least one automotive component comprises at least one of a headlight assembly, a bumper and a grill.

4. The positioning and reinforcement structure of claim 1, further comprising a second wing structure detachably coupled to the second side member, the second wing structure comprising a second side flange configured to operably mount to a second fender assembly.

5. The positioning and reinforcement structure of claim 1, further comprising at least one brace extending from a location proximate the bottom support member and the first side member in a relatively diagonal direction to a location proximate the top support member.

6. The positioning and reinforcement structure of claim 5, wherein the centering bracket is operably coupled to the at least one brace.

7. The positioning and reinforcement structure of claim 1, further comprising at least one aperture configured to receive at least one mechanical fastener for mounting the positioning and reinforcement structure to a radiator support.

8. The positioning and reinforcement structure of claim 1, wherein the centering bracket includes a hood locating aperture for receiving a centering pin operably connected to the hood.

9. The positioning and reinforcement structure of claim 1, wherein the hood includes a hood locating aperture proximate a hood front region for receiving a centering pin operably connected to the centering bracket.

10. A front end assembly for a vehicle comprising:

a fender having an aft end and a forward end, the aft end fixable to a region in close proximity with a front edge of a vehicle door opening, the forward end including a fender flange;

a radiator support directly coupled to a frame of the vehicle; and a positioning and reinforcement structure disposed forwardly of, and removably coupled to, the radiator support, the positioning and reinforcement structure comprising:

a first side flange operably coupled to the fender flange;

a top support member extending relatively horizontally in a cross-car orientation; and a centering bracket disposed proximate a top side of the top support member, the centering bracket configured to locate the positioning and reinforcement structure to a front region of a hood.

11. The front end assembly of claim 10, the positioning and reinforcement structure further comprising a plurality of locating and attachment components for attachment of at least one automotive component to the positioning and reinforcement structure.

12. The front end assembly of claim 11, wherein the at least one automotive component comprises at least one of a headlight assembly, a bumper and a grill.

13. The front end assembly of claim 10, the positioning and reinforcement structure further comprising:

a bottom support member extending relatively horizontally in a cross-car orientation and relatively parallel to the top support member;

a first side member and a second side member each extending relatively vertically and relatively parallel to each other, the first side member and the second side member each coupled to the top support member and the bottom support member.

14. The front end assembly of claim 13, the positioning and reinforcement structure further comprising a first detachable wing structure detachably coupled to the first side member, the first wing structure comprising the first side flange.

15. The front end assembly of claim 14, the positioning and reinforcement structure further comprising a second detachable wing structure detachably coupled to the second side member, the second wing structure comprising a second side flange configured to operably mount to a second fender.

16. The front end assembly of claim 13, further comprising at least one brace extending from a location proximate the bottom support member and the first side member in a relatively diagonal direction to a location proximate the top support member.

17. The front end assembly of claim 16, wherein the centering bracket is operably coupled to the at least one brace.

18. The front end assembly of claim 10, wherein the hood includes a hood locating aperture proximate a hood front region for receiving a centering pin operably connected to the centering bracket.

19. The front end assembly of claim 10, wherein the hood includes a hood locating aperture proximate a hood front region for receiving a centering pin operably connected to the centering bracket.

20. A vehicle comprising:

a rear portion of the vehicle; and a front end portion of the vehicle fixable to the rear portion of the vehicle, the front end portion comprising:

a fender having a forward end including a fender flange;

a radiator support directly fastened to a frame of the vehicle; and a positioning and reinforcement structure disposed forwardly of, and removably coupled to, the radiator support, the positioning and reinforcement structure comprising:

a side flange operably coupled to the fender flange;

a top support member extending relatively horizontally; and a centering bracket disposed proximate a top side of the top support member, the centering bracket configured to locate the positioning and reinforcement structure a front region of a hood.

* * * * *